(12) United States Patent
Sun et al.

(10) Patent No.: US 11,724,298 B1
(45) Date of Patent: Aug. 15, 2023

(54) FORMING METHOD OF NICKEL ALUMINUM ALLOY TUBULAR PART WITH MICRO FLOW CHANNELS

(71) Applicant: Dalian University of Technology, Dalian (CN)

(72) Inventors: Ying Sun, Dalian (CN); Shijian Yuan, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/865,045

(22) Filed: Jul. 14, 2022

(30) Foreign Application Priority Data

Jun. 14, 2022  (CN) .......................... 202210668195.1

(51) Int. Cl.
| | | |
|---|---|---|
| *B21C 37/08* | (2006.01) | |
| *B32B 15/01* | (2006.01) | |
| *F16L 9/02* | (2006.01) | |
| *F16L 9/19* | (2006.01) | |

(52) U.S. Cl.
CPC ............ *B21C 37/08* (2013.01); *B32B 15/017* (2013.01); *F16L 9/02* (2013.01); *F16L 9/19* (2013.01)

(58) Field of Classification Search
CPC ......... B21C 37/08; B21C 37/06; B21C 37/12; B21C 37/14; B32B 15/017; B32B 3/28; B32B 3/30; B32B 1/08; F16L 9/02; F16L 9/19; C22C 21/00; C22C 19/03–19/058; C22C 47/20
USPC .......................................................... 29/904
See application file for complete search history.

(56) References Cited

U.S. PATENT DOCUMENTS

| | | | | |
|---|---|---|---|---|
| 11,084,077 | B2 * | 8/2021 | Hedblom | ................... F16L 9/18 |
| 2002/0185188 | A1 * | 12/2002 | Quigley | ................ F16L 59/143 |
| | | | | 138/140 |
| 2009/0031923 | A1 * | 2/2009 | Teshima | ................... B01J 4/001 |
| | | | | 106/400 |
| 2015/0053293 | A1 * | 2/2015 | Ophaug | ................... F16L 9/123 |
| | | | | 138/140 |

(Continued)

FOREIGN PATENT DOCUMENTS

| | | |
|---|---|---|
| CN | 102921361 A | 2/2013 |
| CN | 110142332 A | 8/2019 |
| CN | 114030237 A | 2/2022 |

*Primary Examiner* — Saran G Afzali
*Assistant Examiner* — Darrell C Ford
(74) *Attorney, Agent, or Firm* — Troutman Pepper Hamilton Sanders LLP (Rochester)

(57) ABSTRACT

A forming method of a nickel aluminum (NiAl) alloy tubular part with micro flow channels including preparing a laminated tube blank. A step of fixing aluminum wires to an outer surface of the laminated tube blank to prepare a middle tube blank. A step of winding a nickel (Ni) flexible substrate and an Al flexible substrate on an outer surface of the middle tube blank to prepare a composite tube blank. A step of carrying out hot gas forming on the composite tube blank to prepare a composite tubular part. A step of carrying out in-mold first-stage reaction synthesis to make the Ni flexible substrate chemically react with the aluminum (Al) flexible substrate. A step of carrying out in-mold second-stage reaction synthesis to melt all the aluminum wires. A step of carrying out hot isostatic pressing treatment to prepare the NiAl alloy tubular part with the micro flow channels.

10 Claims, 5 Drawing Sheets

(56) References Cited

U.S. PATENT DOCUMENTS

2015/0184762 A1\* 7/2015 Angheloiu ............. A61B 5/283
                                                                             137/15.19

\* cited by examiner

FIG.8

FORMING METHOD OF NICKEL ALUMINUM ALLOY TUBULAR PART WITH MICRO FLOW CHANNELS

CROSS REFERENCE TO RELATED APPLICATION

This patent application claims the benefit and priority of Chinese Patent Application No. 202210668195.1, filed on Jun. 14, 2022, the disclosure of which is incorporated by reference herein in its entirety as part of the present application.

TECHNICAL FIELD

The present disclosure relates to the technical field of precision forming of intermetallic compound tubular parts, and in particular relates to a forming method of a nickel aluminum (NiAl) alloy tubular part with micro flow channels.

BACKGROUND

The demands of aerospace vehicles for lightweight and high-temperature-resistant tubular parts are continuously increased to meet the strict requirements of high Mach number, ultra-long endurance and ultra-long voyage. Lightweight and high-temperature-resistant NiAl alloy has the advantages of low density, high specific strength, high specific stiffness and high oxidation resistance, which is an ideal material to replace nickel-based high temperature alloy at present. However, the NiAl alloy, as a typical intermetallic compound material, has the characteristics of poor plasticity at room temperature, high strength at high temperature and insufficient hot forming ability. It is difficult to prepare NiAl alloy tube blanks by using traditional process, and then difficult to form NiAl alloy tubular parts. The NiAl alloy tubular part with the micro flow channel structure inside the tube wall plays an important role in the technical field of cooling due to its unique structural form, and is a component more urgently needed for aerospace vehicles, which is more difficult to form. Therefore, there is an urgent need to research and develop a new technology for forming and manufacturing a NiAl integral special-shaped tubular part with micro flow channels.

For the problems above, the patent with the publication number of CN110142332A provides an integrated method for forming and performance control of NiAl alloy thin-walled tubular parts. The thin-walled tubular parts are obtained by adopting Ni/Al laminated foil blank making, hot-state gas bulging forming and reaction synthesis. By adopting the method, the NiAl alloy thin-walled tubular part with a complex shape can be obtained, but the micro flow channel structure in the tube wall cannot be obtained and can only be achieved through subsequent turning machining which is large in machining difficulty. The patent with the publication number of CN114030237A provides a NiAl alloy honeycomb structure and a preparation method thereof. The method comprises the following steps of taking Ni and Al foil materials as raw materials, firstly obtaining a corrugated sheet through thermal compression, then preparing a honeycomb structure through diffusion bonding, and finally obtaining the NiAl alloy honeycomb structure through thermal treatment. In this method, the dimension of a channel structure is determined by the dimension of the corrugated sheet, which is large in technological limitation and is not suitable for forming tubular components, and it is unable to prepare the NiAl alloy tubular parts with small micro flow channel structures using this method. The patent with the publication number of CN102921361B provides an intermetallic compound with a micro flow structure and a preparation method thereof. This method comprises the steps of taking intermetallic compound element powder as a raw material, embedding an aluminum wire structure in the powder, and finally obtaining the intermetallic compound with the micro flow channel structure through a sintering process. The method is more suitable for preparing a blank with a simple shape, and the overall dimension needs to be achieved by follow-up cutting machining Therefore, it is unable to obtain the NiAl alloy tubular part with a thin-walled structure, a complex shape and high tissue density using this method.

SUMMARY

An objective of the present disclosure is to provide a forming method of a NiAl alloy tubular part with micro flow channels to solve the problems in the prior art. The NiAl alloy tubular part with the micro flow channels can be precisely formed, with high forming dimension precision, uniform structure and few defects.

To achieve the objective, the present disclosure the following solutions:

A forming method of a NiAl alloy tubular part with micro flow channels is provided, comprising the following steps:

S1: continuously winding a Ni flexible substrate and an Al flexible substrate around the same center line to form a first Ni—Al laminated structure with a plurality of layers, wherein the outermost layer and the innermost layer of the first Ni—Al laminated structure are both Ni layers, and treating the first Ni—Al laminated structure into a whole to obtain a laminated tube blank;

S2, fixing a plurality of aluminum wires to an outer surface of the laminated tube blank to obtain a middle tube blank;

S3, continuing to wind the Ni flexible substrate and the Al flexible substrate on an outer surface of the middle tube blank to form a second Ni—Al laminated structure having a plurality of layers, wherein the outermost layer and the innermost layer of the second Ni—Al laminated structure are both Ni layers, and treating the second Ni—Al laminated structure and the middle tube blank into a whole to obtain a composite tube blank;

S4, placing the composite tube blank into a mold for hot gas forming to obtain a composite tubular part;

S5, carrying out in-mold first-stage reaction synthesis to make the Ni flexible substrate chemically react with the Al flexible substrate to obtain a first intermediate of the NiAl alloy tubular part;

S6, carrying out in-mold second-stage reaction synthesis to melt all the aluminum wires to obtain a second intermediate of the NiAl alloy tubular part with a plurality of channel structures; and S7, carrying out hot isostatic pressing treatment on the second intermediate of the NiAl alloy tubular part to obtain the NiAl alloy tubular part with the micro flow channels.

Preferably, in the step S1, the Ni flexible substrate and the Al flexible substrate are continuously wound on an outer surface of a core mold to form the first Ni—Al laminated structure. During winding, the Ni flexible substrate and the Al flexible substrate are stacked together and the Ni flexible substrate is located at the inner side; and after the winding of the Al flexible substrate is completed, the Ni flexible substrate is continuously wound until the Al flexible substrate at the outer layer is completely covered. In the step S3, when the Ni flexible substrate and the Al flexible substrate are continuously wound on the outer surface of the middle tube blank, the Ni flexible substrate and the Al flexible substrate are stacked together and the Ni flexible substrate is located at the inner side, and after the winding of the Al flexible substrate is completed, the Ni flexible substrate is continuously wound until the Al flexible substrate at the outer layer is completely covered.

Preferably, in the step S1, the first Ni—Al laminated structure is treated using a diffusion welding method, a thermo-compression bonding method, an ultrasonic consolidation method, a hot-state internal pressure expansion connecting method or a hot rolling connecting method to obtain the laminated tube blank; in the step S3, the second Ni—Al laminated structure and the middle tube blank are treated using the diffusion welding method, the thermos-compression bonding method, the ultrasonic consolidation method, the hot-state internal pressure expansion connecting method or the hot-rolling connecting method to obtain the composite tube blank.

Preferably, in the step S2, the aluminum wire employs a uniform-section aluminum wire or a variable-section aluminum wire.

Preferably, in the step S2, the surface of the aluminum wire is plated with a Ni—Al laminated film or sprayed with a Ni—Al laminated coating, and the plating mode comprises electrochemical plating, electric evaporation, and multi-arc ion plating.

Preferably, in the step S2, after fixing the aluminum wire, when a ratio of a diameter of the aluminum wire to a thickness of the Al flexible substrate is larger than 5 1, Ni—Al coatings are continuously electroplated or Ni—Al foil materials are laid on the periphery of the aluminum wire for thickness compensation, and the compensated thickness is equal to the diameter of the aluminum wire.

Preferably, in the step S2, the aluminum wire is fixed in a linear fixing mode or a spiral winding mode. The linear fixing mode is that the aluminum wire is linearly fixedly to the outer surface of the laminated tube blank, and the spiral winding mode is that the aluminum is spirally wound on the outer surface of the laminated tube blank.

Preferably, the hot gas forming, the in-mold first-stage reaction synthesis and the in-mold second-stage reaction synthesis need to be carried out in a vacuum environment or an inert gas protection environment.

Preferably, the hot gas forming in the step S4 is carried out at a temperature ranging from temperature 550° C. to 650° C. and the forming pressure of 2 MPa to 50 MPa. The in-mold first stage reaction synthesis in the step S5 is carried at the temperature of 500° C. to 650° C. and the forming pressure of 5 MPa to 100 MPa for 2 h to 10 h. The in-mold second stage reaction synthesis in the step S6 is carried out at the temperature of 680° C. to 800° C. and the forming pressure of 1 MPa to 20 MPa for 1 h to 5 h. The hot isostatic pressure treatment in the step S7 is carried out at the temperature of 1000° C. to 1300° C. and the operating pressure of 10 MPa to 100 MPa for 1 h to 10 h, gaseous environment 99.99% argon purity.

Preferably, in the step S4, a temperature sensor and a pressure sensor are arranged in the mold, and the temperature sensor and the pressure sensor are both in signal connection with a controller.

Compared with the prior art, the present disclosure has the following technical effects:

In accordance with a forming method of a NiAl alloy tubular part with micro flow channels, integrated forming of the NiAl alloy tubular part and the micro flow channels can be achieved, with high precision of component shape, good consistency of micro flow channel dimension, no weld seam in the whole, high structural strength, and excellent organizational properties. A wall thickness of the NiAl alloy tubular part is accurately controlled by the Ni—Al laminated structure, the micro flow channel structure is accurately controlled by the laying of aluminum wires, and the design of the wall thickness and the dimension of the micro flow channel is wide in range, such that the synchronous control over the wall thickness of the NiAl alloy tubular part and the micro flow channel can be achieved. The overall dimension precision of the NiAl alloy tubular part and the position precision of the micro flow channel can be accurately controlled by the lay-up design and the forming process, and the micro structure can also be controlled and adjusted.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

In the drawings: 1—Ni flexible substrate; 2—Al flexible substrate; 3—aluminum wire; 4—mold; 5—micro flow channel; 10—laminated tube blank; 20—middle tube blank; 30—composite tube blank; 40—NiAl alloy tubular part with micro flow channel

DETAILED DESCRIPTION

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An exemplary objective of the present disclosure is to provide a forming method of a NiAl alloy tubular part with micro flow channels to solve the problems in the prior art. The NiAl alloy tubular part with the micro flow channels can be precisely formed, with high forming dimension precision, uniform structure and few defects.

To make the above exemplary objects, features and advantages of the present disclosure more apparent and understandable, the following further describes the present disclosure in detail with reference to the accompanying drawings and specific embodiments.

Figure 1:
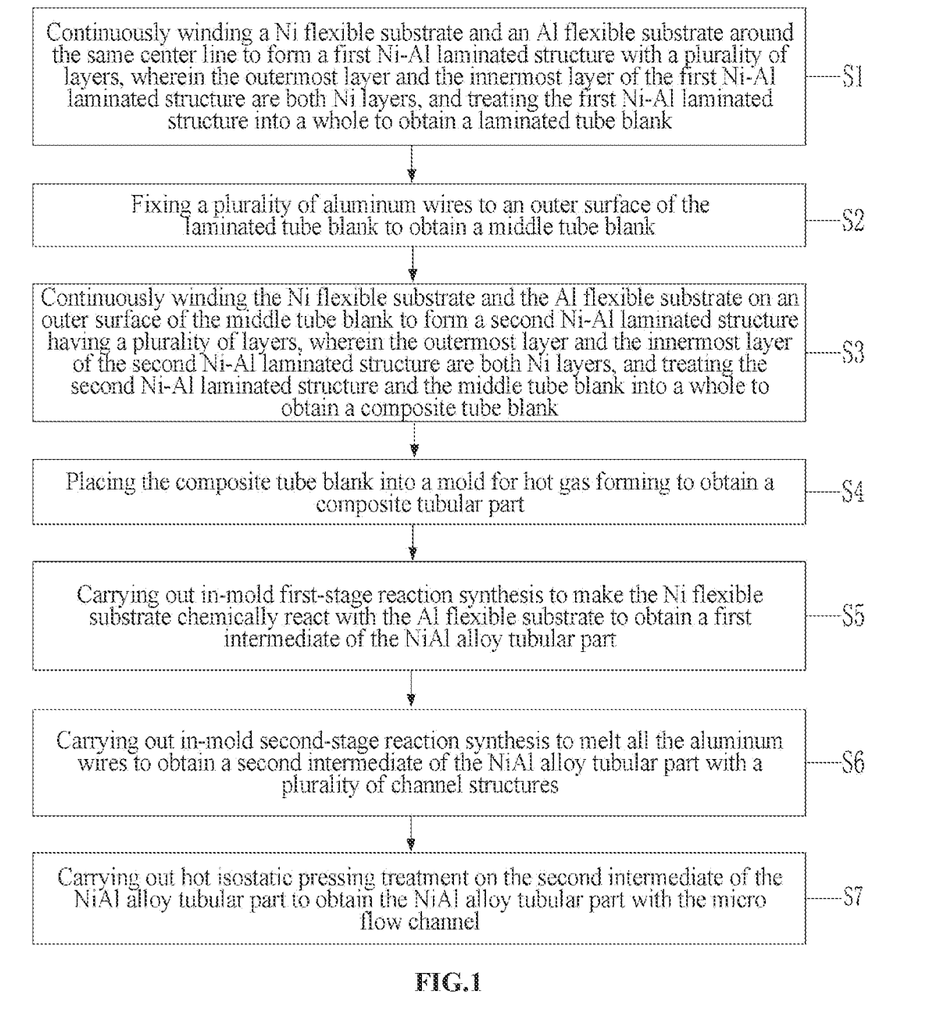
FIG. 1 is a flowchart of a forming method of a NiAl alloy tubular part with micro flow channels in accordance with the present disclosure.
Figure 2:
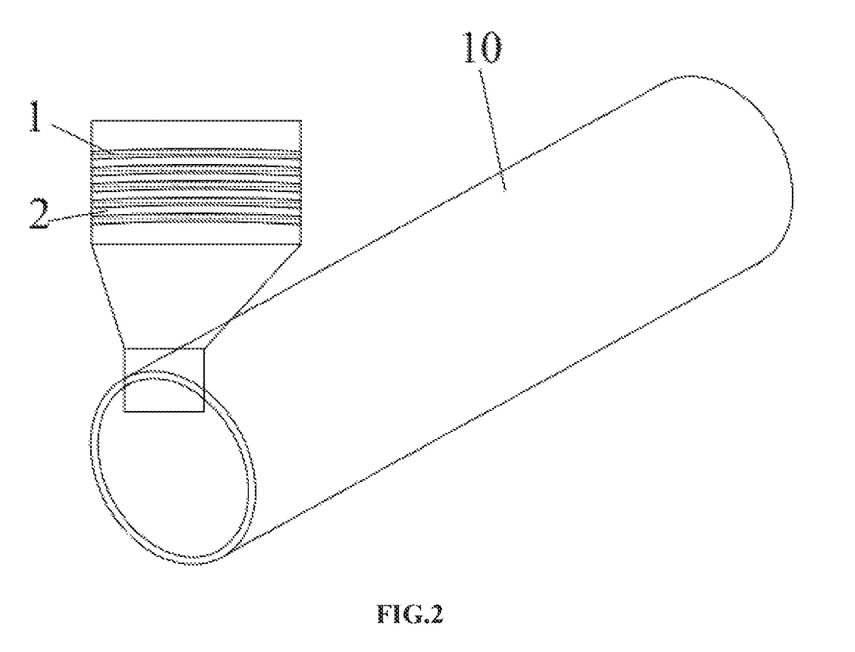
FIG. 2 is a schematic diagram of a structure of a laminated tube blank in accordance with the present disclosure.
Figure 3:
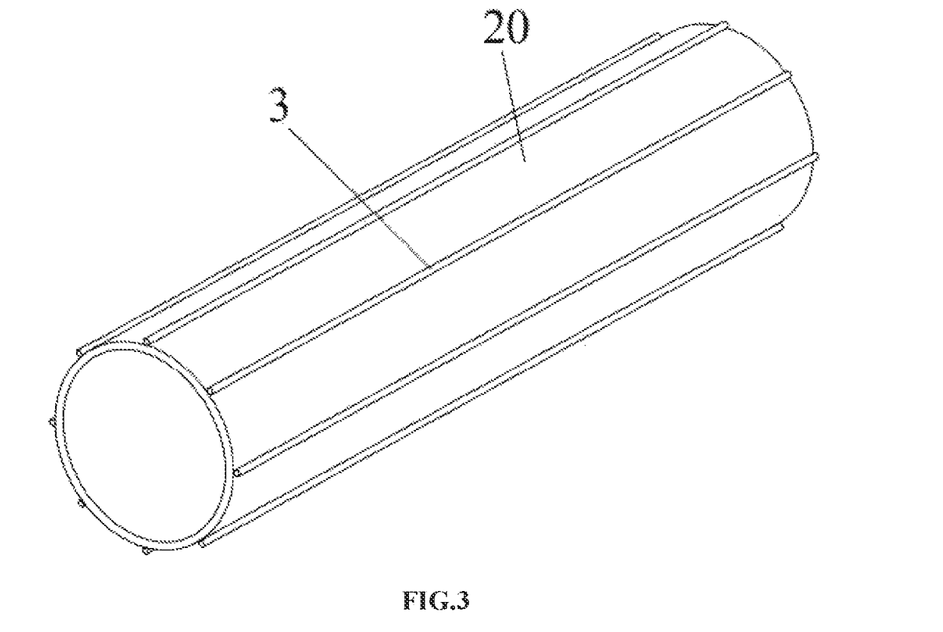
FIG. 3 is a schematic diagram of a structure of a middle tube blank in accordance with the present disclosure.
Figure 4:
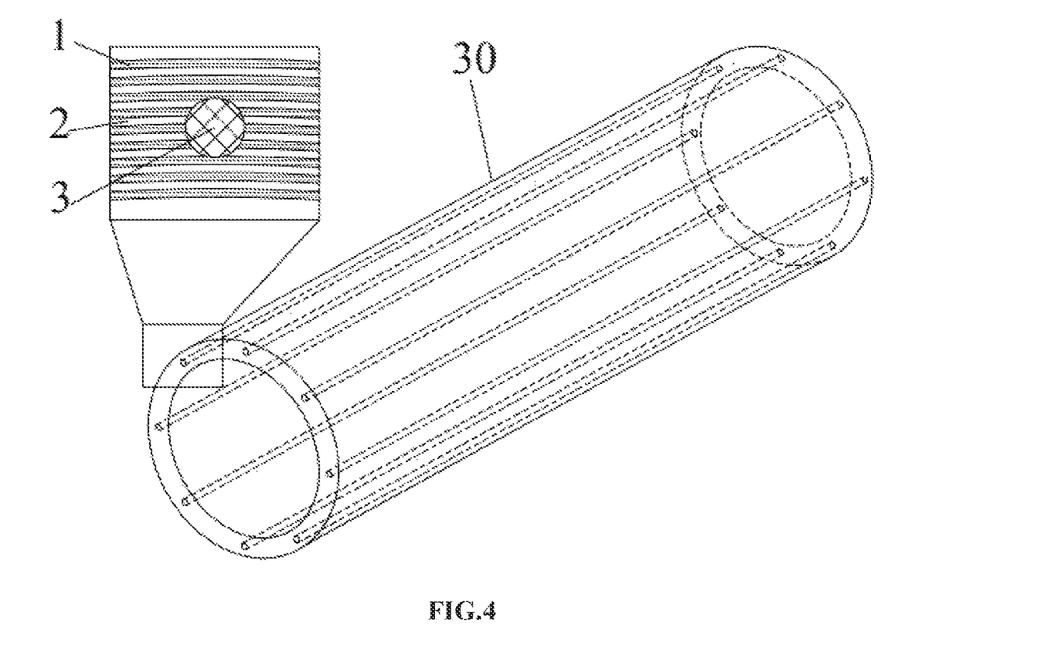
FIG. 4 is a schematic diagram of a structure of a composite tube blank in accordance with the present disclosure.
Figure 5:
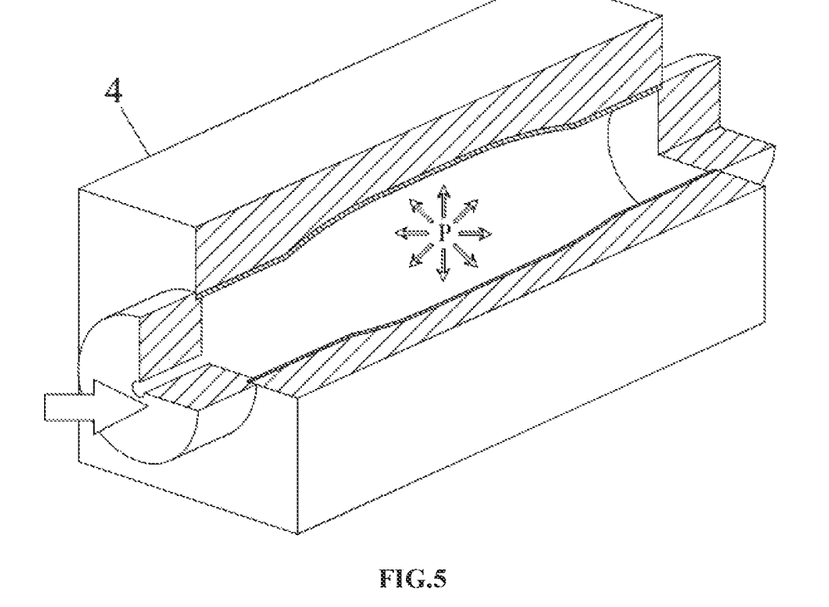
FIG. 5 is a schematic diagram of a structure in hot gas forming, in-mold first-stage reaction synthesis and in-mold second-stage reaction synthesis of the composite tube blank in accordance with the present disclosure.
Figure 6:
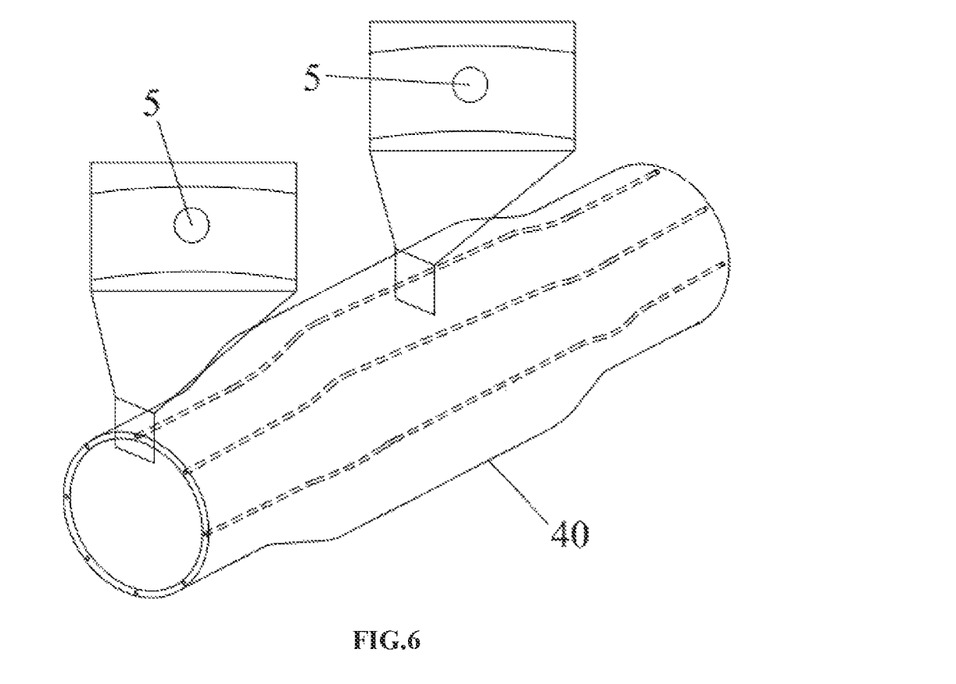
FIG. 6 is a schematic diagram of a NiAl alloy tubular part with micro flow channels obtained after hot isostatic pressure treatment in accordance with the present disclosure.

As shown in FIG. 1 to FIG. 8, a forming method of a NiAl alloy tubular part with micro flow channels is provided, comprising the following steps:

S1: continuously winding a Ni flexible substrate 1 and an Al flexible substrate 2 around the same center line to form a first Ni—Al laminated structure with a plurality of layers, wherein the outermost layer and the innermost layer of the first Ni—Al laminated structure are both Ni layers, and treating the first Ni—Al laminated structure into a whole to obtain a laminated tube blank 10;

S2, fixing a plurality of aluminum wires 3 to an outer surface of the laminated tube blank 10 to obtain a middle tube blank 20;

S3, continuously winding the Ni flexible substrate 1 and the Al flexible substrate 2 on an outer surface of the middle tube blank 20 to form a second Ni—Al laminated structure having a plurality of layers, wherein the outermost layer and the innermost layer of the second Ni—Al laminated structure are both Ni layers, and treating the second Ni—Al laminated structure and the middle tube blank 20 into a whole to obtain a composite tube blank 30;

S4, placing the composite tube blank 30 into a mold 4 for hot gas forming to obtain a composite tubular part;

S5, carrying out in-mold first-stage reaction synthesis to make the Ni flexible substrate 1 chemically react with the Al flexible substrate 2 to obtain a first intermediate of the NiAl alloy tubular part;

S6, carrying out in-mold second-stage reaction synthesis to melt all the aluminum wires 3 to obtain a second intermediate of the NiAl alloy tubular part with a plurality of channel structures; and S7, carrying out hot isostatic pressing treatment on the second intermediate of the NiAl alloy tubular part to obtain the NiAl alloy tubular part 40 with the micro flow channels.

Wherein the Ni flexible substrate 1 and the Al flexible substrate 2 may employ foil strips, the Ni foil strip, the Al foil strip and the aluminum wire are made of high-purity materials, the overall dimensions thereof, such as the length, the width and the thickness, need to be selected after being calculated according to the size of a target component. The thicknesses of the Ni and Al foil strips are calculated from composition intervals in a Ni—Al binary phase diagram. The dimension of the aluminum wire 3 can be selected in the range of 0.01 to 50 mm During the in-mold first-stage reaction synthesis, the Al foil strip is completely reacted. In accordance with the method, the Al wire is placed inside the Ni—Al laminated foil tube blank, the shape and dimension required by the tubular part are obtained after integral forming, then the NiAl alloy special-shaped tubular part with the micro flow channel 5 structure is finally formed through reaction synthesis and hot isostatic pressing treatment. Therefore, the integrated forming of the NiAl alloy tubular part and the micro flow channel 5 is achieved, with high precision of component shape, good consistency of micro flow channel 5 dimensions, no weld seam in the whole, high structural strength, and excellent organizational properties.

In the step S1, the Ni flexible substrate 1 and the Al flexible substrate 2 are continuously wound on the outer surface of a core mold to form the first Ni—Al laminated structure. During winding, the Ni flexible substrate 1 and the Al flexible substrate 2 are stacked together and the Ni flexible substrate 1 is located at the inner side; and after the winding of the Al flexible substrate 2 is completed, the Ni flexible substrate 1 is continuously wound until the Al flexible substrate 2 at the outer layer is completely covered, thereby guaranteeing that the outermost layer and the innermost layer of the first Ni—Al laminated structure are both Ni layers. In the step S3, when the Ni flexible substrate 1 and the Al flexible substrate 2 are continuously wound on the outer surface of the middle tube blank 20, the Ni flexible substrate 1 and the Al flexible substrate 2 are stacked together and the Ni flexible substrate 1 is located at the inner side, and after the winding of the Al flexible substrate 2 is completed, the Ni flexible substrate 1 is continuously wound until the Al flexible substrate 2 at the outer layer is completely covered.

In the step S1, the first Ni—Al laminated structure is treated using a diffusion welding method, a thermo-compression bonding method, an ultrasonic consolidation method, a hot-state internal pressure expansion connecting method or a hot rolling connecting method to obtain the laminated tube blank 10. In the step S3, the second Ni—Al laminated structure and the middle tube blank 20 are treated using the diffusion welding method, the thermos-compression bonding method, the ultrasonic consolidation method, the hot-state internal pressure expansion connecting method or the hot-rolling connecting method to obtain the composite tube blank 30. Wherein the hot-state internal pressure expansion connecting refers to a method in which laminated metallic foil strips are continuously wound on the surface of an inner tube and then are integrally placed in a hot-state mold, such that the scattered laminated metallic foil strips are connected into a whole under the combined action of the bulging force of the inner tube and the restraining force of a mold cavity. The hot-rolling connecting method refers to a method in which the laminated metallic foil strips are continuously wound on an outer surface of a core roll, such that the scattered laminated foil strips are connected into a whole under the pressure of a rotating roll.

Figure 8:
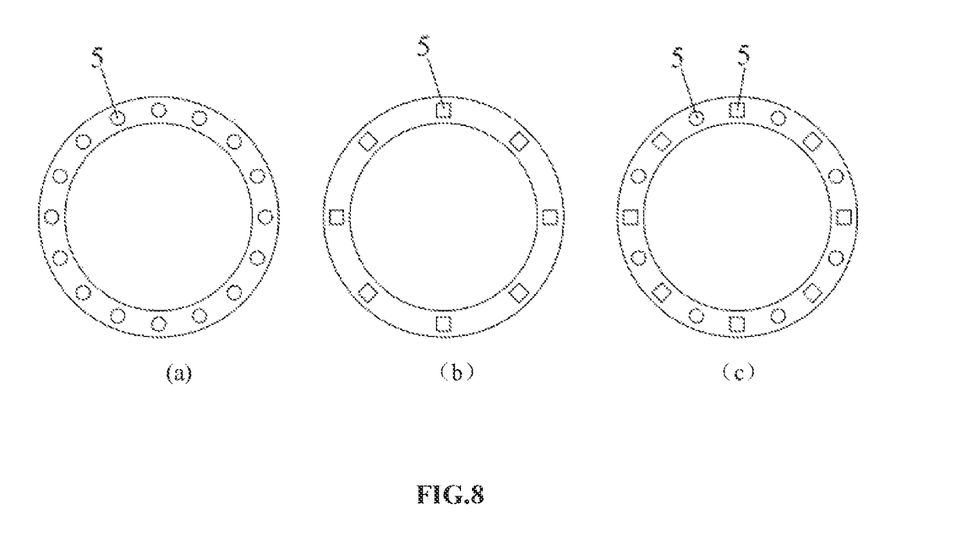
FIG. 8 is a schematic diagram of a cross section of a NiAl alloy tubular part with complex micro flow channel structural layout and shape optimization in accordance with the present disclosure.

In the step S2, the aluminum wire 3 employs a uniform-section aluminum wire or a variable-section aluminum wire. The uniform-section aluminum wire refers to that the aluminum wire 3 has the same sections at various parts in a length direction, such as a round section, a trapezoid section, and a square section. A schematic diagram of a cross section of a NiAl alloy tubular part with a round micro flow channel 5 prepared from the aluminum wire 3 with the round section is shown in FIG. 8(a). A schematic diagram of a cross section of a NiAl alloy tubular part with a square micro flow channel 5 prepared from the aluminum wire 3 with the square section is shown in FIG. 8(b). A schematic diagram of a cross section of a NiAl alloy tubular part with round and square micro flow channels 5 prepared from the aluminum wires 3 with the round section and the square section is shown in FIG. 8(c). The variable-section aluminum wire refers to that the aluminum wire 3 has different section shapes at various parts in a length direction so as to meet different demands of the micro flow channels 5 at different locations for section shapes.

In the step S2, prior to fixing the aluminum wire 3, the surface of the aluminum wire 3 is plated with a Ni—Al laminated film or sprayed with a Ni—Al laminated coating, thereby improving the precision of the sectional shape of the formed micro flow channel 5, wherein the plating mode comprises, but is not limited to, electrochemical plating, electric evaporation, and multi-arc ion plating.

In the step S2, after fixing the aluminum wire 3, when a ratio of a diameter of the aluminum wire 3 to a thickness of the Al flexible substrate is larger than 5:1, Ni—Al coatings are continuously electroplated or Ni—Al foil materials are stacked on the periphery of the aluminum wire 3 for thickness compensation, and the compensated thickness is equal to the diameter of the aluminum wire 3.

Figure 7:
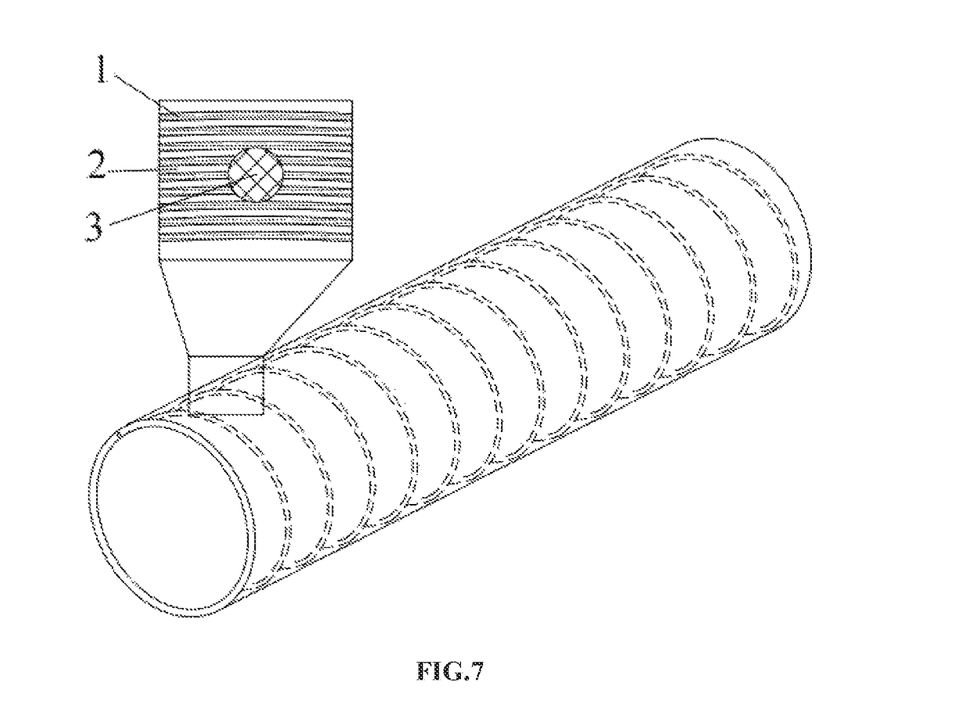
FIG. 7 is a schematic diagram of structure for fixing an aluminum wire on an outer surface of the laminated tube blank in a spiral winding mode in accordance with the present disclosure.

In the step S2, the aluminum wire 3 is fixed in a linear fixing mode or a spiral winding mode. The linear fixing mode refers to that the aluminum wire 3 is linearly fixedly to the outer surface of the laminated tube blank 10, and the spiral winding mode refers to that the aluminum wire 3 is spirally wound on the outer surface of the laminated tube blank 10. The fixing mode of the aluminum wire 3 is not limited to the above two modes, and can be set accordingly according to the actual needs so as to obtain the NiAl alloy tubular part with micro flow channels 5 in different spatial layouts.

The hot gas forming, the in-mold first-stage reaction synthesis and the in-mold second-stage reaction synthesis need to be carried out in a vacuum environment or an inert gas protection environment.

The hot gas forming in the step S4 is carried out at a temperature ranging from temperature 550° C. to 650° C. and the forming pressure of 2 MPa to 50 MPa. The in-mold first stage reaction synthesis in the step S5 is carried at the temperature of 500° C. to 650° C. and the forming pressure of 5 MPa to 100 MPa for 2 h to 10 h. The in-mold second stage reaction synthesis in the step S6 is carried out at the temperature of 680° C. to 800° C. and the forming pressure of 1 MPa to 20 MPa for 1 h to 5 h. The hot isostatic pressure treatment in the step S7 is carried out at the temperature of 1000° C. to 1300° C. and the operating pressure of 10 MPa to 100 MPa for 1 h to 10 h, gaseous environment 99.99% argon purity.

In the step S4, a temperature sensor and a pressure sensor are arranged in the mold 4, and the temperature sensor and the pressure sensor are both in signal connection with a controller to achieve partitioned temperature control, partitioned shape control and partitioned controllability of the mold 4, thereby achieving the precise forming of the tubular part. The "partitioned temperature control, partitioned shape control and partitioned controllability" are achieved through the following modes: designing the mold 4 into a split combination form, and respectively providing the temperature sensor, the pressure sensor, a displacement sensor and a thermocouple separately the split areas of the mold 4. In the plastic forming and reaction synthesis process of the tubular part, real-time data can be obtained through the sensors, and feedback adjustment is carried out through the controller, such that each area of the tubular part can obtain the best forming effect, and the forming precision and the structure uniformity of the tubular part are improved.

The following further describes the present disclosure in conjunction with the specific embodiments:

Embodiment 1

(1) A forming method comprises the following steps: taking a 0.06 mm Ni foil strip and a 0.1 mm Al foil strip as raw materials, cleaning oil stains and oxidation films by adopting steel brush polishing, sand blasting polishing and the like, continuously winding the foil strips on an outer surface of a core mold, and then connecting the wound dissimilar foil strips in a scattered state into a whole through an ultrasonic consolidation process to prepare a laminated tube blank 10 with a wall thickness of 5 mm, a tube diameter of 200 mm and a tube length of 800 mm and having a Ni—Al laminated structure, wherein in the ultrasonic consolidation process, the consolidation speed is 5 to 50 mm/s, the amplitude is 10 to 50 μm, and the pressure is 5 to 20 KN;

(2) uniformly distributing eight aluminum wires having a diameter of 2 mm, a round section and a consistent section dimension in an axial direction at the circumference of the laminated tube blank 10 according to a direction parallel to an axial line of the laminated tube blank 10, and fixing the aluminum wires to an outer surface of the laminated tube blank 10; laying the 0.03 mm Ni and the 0.05 mm Al foils at the periphery of the aluminum wires 3 for thickness compensation to prepare the middle tube blank 20, wherein the total compensation thickness is 2 mm;

(3) continuously winding the Ni foil strip and the Al foil strip on the outer surface of the middle tube blank 20, and connecting the whole by adopting the ultrasonic consolidation process to prepare a composite tube blank 30 with a wall thickness of 10 mm, wherein in the ultrasonic consolidation process, the consolidation speed is 5 to 50 mm/s, the amplitude is 10 to 50 μm, and the pressure is 5 to 20 KN;

(4) placing the composite tube blank 30 into a mold 4, placing the entire mold 4 in a vacuum environment for hot gas forming to obtain a specified shape and dimension, wherein the hot gas forming is carried out at the temperature of 550° C. and the atmospheric pressure of 25 MPa, and employs argon as a bulging gas medium;

(5) continuously introducing the high-pressure argon into the hot gas forming mold 4 to make the tubular part undergo the first-stage reaction synthesis in the mold 4 to obtain a first intermediate of a NiAl alloy tubular part, wherein the reaction synthesis is carried out at the temperature of 620° C. and the atmospheric pressure of 50 MPa for 6 h;

(6) continuously introducing the high-pressure argon into the hot gas forming mold 4 to make the tubular part undergo the second-stage reaction synthesis in the mold 4 to obtain a second intermediate of the NiAl alloy tubular part with a plurality of channel structures, wherein the second-stage reaction synthesis is carried out at the temperature of 800° C. and the atmospheric pressure is 5 MPa for 1 h; and (7) carrying out hot isostatic pressure treatment on the second intermediate of the NiAl alloy tubular part with the plurality of channel structures to obtain the NiAl alloy tubular part 40 with micro flow channels, wherein the hot isostatic pressure treatment is carried out at the temperature of 1300° C. and the pressure of 50 MPa for 5 h.

Embodiment 2

(1) A forming method comprises the following steps: taking a 0.06 mm Ni foil strip and a 0.1 mm Al foil strip as raw materials, cleaning oil stains and oxidation films by adopting chemical agents such as HF, NaOH, continuously winding the foil strips on the outer surface of a core mold, and then connecting the wound dissimilar foil strips in a scattered state into a whole by a hot-state internal pressure expansion connecting process to prepare a laminated tube blank 10 with a wall thickness of 6 mm, a tube diameter of 300 mm and a tube length of 1000 mm and having a Ni—Al laminated structure, wherein in the hot-state internal pressure expansion connecting process, the expansion connecting temperature is 620° C., the atmospheric pressure is 30 MPa, the argon serves as a bulging medium, and an inner tube for expansion connecting is a copper tube;

(2) employing an aluminum wire 3 with a square section, a consistent sectional dimension along an axial direction, and a sectional side length of 1.5 mm, continuously plating Ni—Al—Ni—Al—Ni layers on the surface of the aluminum wire 3 by adopting an electrochemical plating method, wherein each layer has a thickness of 20 pm; uniformly winding the aluminum wire in a spiral winding mode to fix the aluminum wire to an outer surface of the laminated tube blank 10; and continuously electroplating the Ni—Al coating at the periphery of the aluminum wire 3 for thickness compensation to prepare a middle tube blank 20, wherein the total compensation thickness is 2 mm;

(3) continuously winding the Ni foil strip and the Al foil strip on an outer surface of the middle tube blank 20, and connecting the whole by adopting an ultrasonic consolidation process to prepare a composite tube blank 30 with a wall thickness of 12 mm, wherein in the ultrasonic consolidation process, the consolidation speed is 5 to 50 mm/s, the amplitude is 10 to 50 μm, and the pressure is 5 to 20 KN;

(4) placing the composite tube blank 30 into a mold 4, placing the entire mold in a vacuum environment for hot gas forming to obtain a specified shape and dimension, wherein the hot gas forming is carried out at the temperature of 630° C. and the atmospheric pressure of 50 MPa, and employs argon as a bulging gas medium;

(5) continuously introducing the high-pressure argon into the hot gas forming mold 4 to make the tubular part undergo the first-stage reaction synthesis in the mold 4 to obtain a first intermediate of a NiAl alloy tubular part, wherein the reaction synthesis is carried out at the temperature of 640° C. and the atmospheric pressure of 40 MPa for 5 h;

(6) continuously introducing the high-pressure argon into the hot gas forming mold 4 to make the tubular part undergo the second-stage reaction synthesis in the mold 4 to obtain a second intermediate of the NiAl alloy tubular part with a plurality of channel structures, wherein second-stage reaction synthesis is carried at the temperature of 700° C. and the atmospheric pressure of 4 MPa for 2 h; and (7) carrying out hot isostatic pressure treatment on the second intermediate of the NiAl alloy tubular part with the plurality of channel structures obtain the NiAl alloy tubular part 40 with micro flow channels, wherein the hot isostatic pressure treatment is carried out at the temperature of 1200° C. and the pressure of 100 MPa for 4 h.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

We claim:

1. A forming method of a nickel aluminum (NiAl) alloy tubular part with micro flow channels, comprising the following steps in order:

S1, continuously winding a nickel (Ni) flexible substrate and an aluminum (Al) flexible substrate around a same winding center line to form a first nickel-aluminum (Ni—Al) laminated structure with a plurality of layers, wherein an outermost layer and an innermost layer of the first Ni—Al laminated structure are both Ni layers, and treating the first Ni—Al laminated structure into a whole to obtain a laminated tube blank;

S2, fixing a plurality of aluminum wires to an outer surface of the laminated tube blank to obtain a middle tube blank;

S3, continuously winding the Ni flexible substrate and the Al flexible substrate on an outer surface of the middle tube blank to form a second Ni—Al laminated structure having a plurality of layers, wherein an outermost layer and an innermost layer of the second Ni—Al laminated structure are both Ni layers, and treating the second Ni—Al laminated structure and the middle tube blank into a whole to obtain a composite tube blank;

S4, placing the composite tube blank into a mold for hot gas forming to obtain a composite tubular part;

S5, carrying out in-mold first-stage reaction synthesis to make the Ni flexible substrate chemically react with the Al flexible substrate to obtain a first intermediate of the NiAl alloy tubular part;

S6, carrying out in-mold second-stage reaction synthesis to melt all the aluminum wires to obtain a second intermediate of the NiAl alloy tubular part with a plurality of channel structures; and S7, carrying out hot isostatic pressing treatment on the second intermediate of the NiAl alloy tubular part to obtain the NiAl alloy tubular part with the micro flow channels.

2. The forming method of the NiAl alloy tubular part with the micro flow channels according to claim 1, wherein in the step S1, the Ni flexible substrate and the Al flexible substrate are continuously wound on an outer surface of a core mold to form the first Ni—Al laminated structure; during winding, the Ni flexible substrate and the Al flexible substrate are stacked together and the Ni flexible substrate is located at an inner side; after the winding of the Al flexible substrate is completed, the Ni flexible substrate is continuously wound until the Al flexible substrate at an outer layer is completely covered; in the step S3, when the Ni flexible substrate and the Al flexible substrate are continuously wound on the outer surface of the middle tube blank, the Ni flexible substrate and the Al flexible substrate are stacked together and the Ni flexible substrate is located at the inner side, and after the winding of the Al flexible substrate is completed, the Ni flexible substrate is continuously wound until the Al flexible substrate at the outer layer is completely covered.

3. The forming method of the NiAl alloy tubular part with the micro flow channels according to claim 1, wherein in the step S1, the first Ni—Al laminated structure is treated using a diffusion welding method, a thermo-compression bonding method, an ultrasonic consolidation method, a hot-state internal pressure expansion connecting method or a hot rolling connecting method to obtain the laminated tube blank; in the step S3, the second Ni—Al laminated structure and the middle tube blank are treated using the diffusion welding method, the thermos-compression bonding method, the ultrasonic consolidation method, the hot-state internal pressure expansion connecting method or the hot-rolling connecting method to obtain the composite tube blank.

4. The forming method of the NiAl alloy tubular part with the micro flow channels according to claim 1, wherein in the step S2, the aluminum wire employs a uniform-section aluminum wire or a variable-section aluminum wire.

5. The forming method of the NiAl alloy tubular part with the micro flow channels according to claim 1, wherein in the step S2, prior to fixing the aluminum wire, a surface of the aluminum wire is plated with a Ni—Al laminated film or sprayed with a Ni—Al laminated coating, and a plating mode comprises electrochemical plating, electric evaporation, and multi-arc ion plating.

6. The forming method of the NiAl alloy tubular part with the micro flow channels according to claim 1, wherein in the step S2, after fixing the aluminum wire, when a ratio of a diameter of the aluminum wire to a thickness of the Al flexible substrate is larger than 5:1, Ni—Al coatings are continuously electroplated or Ni—Al foil materials are laid on a periphery of the aluminum wire for thickness compensation, and the compensated thickness is equal to the diameter of the aluminum wire.

7. The forming method of the NiAl alloy tubular part with the micro flow channels according to claim 1, wherein in the step S2, the aluminum wire is fixed in a linear fixing mode or a spiral winding mode; the linear fixing mode is that the aluminum wire is linearly fixedly to the outer surface of the laminated tube blank, and the spiral winding mode is that the aluminum is spirally wound on the outer surface of the laminated tube blank.

8. The forming method of the NiAl alloy tubular part with the micro flow channels according to claim 1, wherein the hot gas forming, the in-mold first-stage reaction synthesis and the in-mold second-stage reaction synthesis need to be carried out in a vacuum environment or an inert gas protection environment.

9. The forming method of the NiAl alloy tubular part with the micro flow channels according to claim 1, wherein in the hot gas forming in the step S4 is carried out at a temperature ranging from 550° C. to 650° C. and a forming pressure of 2 MPa to 50 MPa; the in-mold first stage reaction synthesis in the step S5 is carried at a temperature of 500° C. to 650° C. and a forming pressure of 5 MPa to 100 MPa for 2 h to 10 h; the in-mold second stage reaction synthesis in the step S6 is carried out at a temperature of 680° C. to 800° C. and a forming pressure of 1 MPa to 20 MPa for 1 h to 5 h; and the hot isostatic pressure treatment in the step S7 is carried out at a temperature of 1000° C. to 1300° C. and an operating pressure of 10 MPa to 100 MPa for 1 h to 10 h, gaseous environment 99.99% argon purity.

10. The forming method of the NiAl alloy tubular part with the micro flow channels according to claim 1, wherein in the step S4, a temperature sensor and a pressure sensor are arranged in the mold, and the temperature sensor and the pressure sensor are both in signal connection with a controller.

* * * * *